(12) United States Patent
Aufderheide et al.

(10) Patent No.: US 8,068,186 B2
(45) Date of Patent: Nov. 29, 2011

(54) PATTERNED CONDUCTOR TOUCH SCREEN HAVING IMPROVED OPTICS

(75) Inventors: Brian E. Aufderheide, Cedarburg, WI (US); Joseph C. Spang, Waukesha, WI (US); Jonathan P. Maag, New Berlin, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 2532 days.

(21) Appl. No.: 10/686,141

(22) Filed: Oct. 15, 2003

(65) Prior Publication Data

US 2005/0083307 A1    Apr. 21, 2005

(51) Int. Cl.
*G02F 1/1335* (2006.01)
(52) U.S. Cl. ........................................................ 349/12
(58) Field of Classification Search .................. None
See application file for complete search history.

(56) References Cited

U.S. PATENT DOCUMENTS

| | | | |
|---|---|---|---|
| 4,715,686 A | 12/1987 | Iwashita et al. | |
| 4,786,767 A | 11/1988 | Kuhlman | |
| 5,386,219 A * | 1/1995 | Greanias et al. | 345/174 |
| 5,556,694 A | 9/1996 | Austin | |
| 5,650,597 A | 7/1997 | Redmayne | |
| 5,844,506 A | 12/1998 | Binstead | |
| 6,188,391 B1 | 2/2001 | Seely et al. | |
| 6,266,193 B1 * | 7/2001 | Saif et al. | 359/582 |
| 6,512,512 B1 | 1/2003 | Blanchard | |
| 6,522,322 B1 | 2/2003 | Maeda et al. | |
| 6,583,935 B1 * | 6/2003 | Saif et al. | 359/582 |
| 6,628,355 B1 * | 9/2003 | Takahara | 349/106 |
| 7,030,860 B1 | 4/2006 | Hsu et al. | |
| 2001/0055673 A1 | 12/2001 | Getz | |
| 2002/0086188 A1 | 7/2002 | Halsey, IV et al. | |
| 2003/0103043 A1 | 6/2003 | Mulligan et al. | |
| 2003/0203101 A1 | 10/2003 | Haubrich et al. | |

FOREIGN PATENT DOCUMENTS

| | | |
|---|---|---|
| EP | 1172831 | 1/2002 |
| JP | 6222352 | 8/1994 |
| JP | 9185457 | 7/1997 |
| JP | 2763472 | 6/1998 |
| WO | WO 01/27868 | 4/2001 |
| WO | WO 01/52416 | 7/2001 |
| WO | WO 02/100074 | 12/2002 |

OTHER PUBLICATIONS

U.S. Appl. No. 10/176,564, filed Jun. 21, 2002, Capacitive Touch Sensor Architecture with Unique Sensor Bar Addressing.
U.S. Appl. No. 10/201,400, filed Jul. 23, 2002, Thin Face Capacitive Touch Screen.
U.S. Appl. No. 10/324,728, filed Dec. 19, 2002, Lattice Touch-sensing System.
3M Engineered Adhesives Division, "Optically Clear Laminating Adhesives", Jun. 2001.

* cited by examiner

*Primary Examiner* — Timothy L Rude
(74) *Attorney, Agent, or Firm* — Johannes P. M. Kusters

(57) ABSTRACT

The present invention provides a touch screen that includes a pattern of transparent conductors as touch sensing elements, and that has a layered construction configured to reduce the visibility of the transparent conductor pattern. The construction includes a coating covering a substrate, the transparent conductor pattern disposed on the coating, and a filler material covering and contacting the transparent conductor pattern and the areas of the coating not covered by the transparent conductor pattern, where the index of refraction of the filler material is less than the index of refraction of the substrate and less than the index of refraction of the transparent conductor pattern.

38 Claims, 4 Drawing Sheets

PATTERNED CONDUCTOR TOUCH SCREEN HAVING IMPROVED OPTICS

This invention relates to touch screens, and particularly to on-display touch screens that utilize a pattern of transparent conductors as the touch sensing elements.

BACKGROUND

Touch screens have become an increasingly common way for users to intuitively interact with electronic systems, typically those that include displays for viewing information. Touch screens include transparent touch screens that can be disposed over variable displays and/or static images so that the displayed information and images can be viewed through the touch screen. Touch screen technologies that can be used in such configurations include resistive, capacitive, projected capacitive, and surface acoustic wave, among others. Many projected capacitive touch screens utilize a pattern of conductors as the sensing elements. The term "projected capacitive" refers to the ability of the pattern of conductors to project a field through a relatively thick dielectric such as a thin glass panel, the glove of a gloved finger, and so forth. Because projected capacitive touch screens can sense through thicker materials, such touch screens can be ruggedized and made vandal resistant, and therefore can be well suited to public access applications and extreme environments.

SUMMARY OF THE INVENTION

In one aspect, the present invention provides a construction for a touch screen that includes a substrate, a coating substantially covering the substrate, a transparent conductor pattern disposed on the coating, the pattern leaving areas of the coating uncovered, and a filler material covering and contacting both the transparent conductor pattern and the areas of the coating not covered by the transparent conductor pattern. The coating has a refractive index that is less than the refractive index of the substrate and less than the refractive index of the transparent conductor pattern. A second substrate can optionally be disposed over the filler material.

The present invention also provides a touch screen construction that includes a transparent conductor patterned on a substrate, a first layer substantially covering the substrate and disposed between the transparent conductor and the substrate, the first layer configured to increase visible light transmission through the touch screen construction in areas covered by the transparent conductor, and a second layer disposed to contact the transparent conductor in areas covered by the transparent conductor and to contact the first layer in areas not covered by the transparent conductor, the second layer configured to substantially inhibit visible light reflections at contact interfaces between the first layer and the second layer.

The present invention also provides a method for reducing the visibility of a patterned transparent conductor in a touch screen. The method includes coating an undercoat material between a substrate and a patterned transparent conductor so that the undercoat material substantially covers the substrate, the undercoat material having a refractive index that is less than that of the substrate and that of the patterned transparent conductor. The patterned transparent conductor leaves areas of the undercoat material exposed. The method also includes disposing a filler material over the patterned transparent conductor and exposed areas of the undercoat material, the filler material having a refractive index and thickness selected to reduce interfacial reflections of visible light in areas covered by the patterned transparent conductor.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
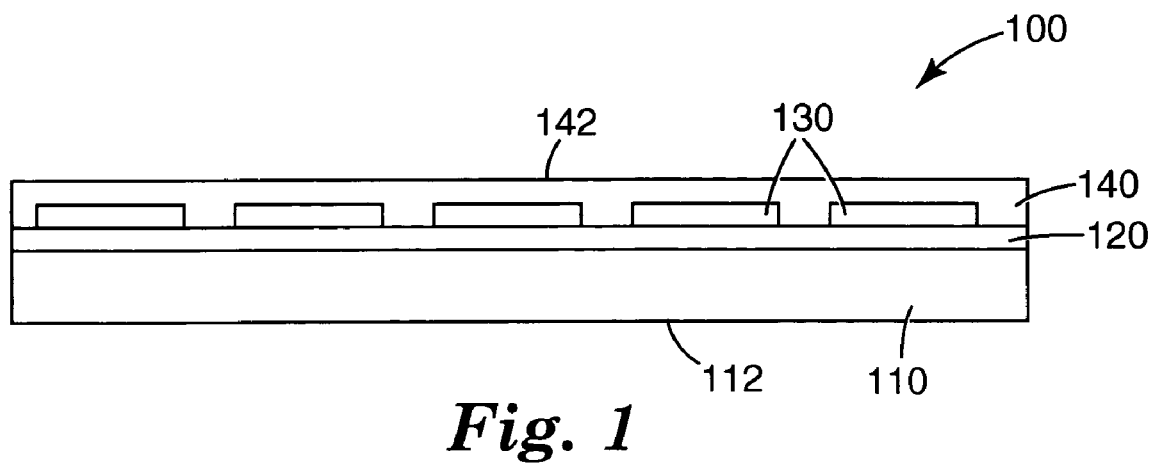
FIG. 1 is a schematic side view of a touch screen construction of the present invention.

While the invention is amenable to various modifications and alternative forms, specifics thereof have been shown by way of example in the drawings and will be described in detail. It should be understood, however, that the intention is not to limit the invention to the. particular embodiments described. On the contrary, the intention is to cover all modifications, equivalents, and alternatives falling within the spirit and scope of the invention.

DETAILED DESCRIPTION

The present invention is related to touch screens, particularly to touch screens that utilize a pattern of transparent conductors as sensing elements, and even more particularly to such touch screens that are transmissive of visible light so that an image can be viewed through the touch screen, for example on-display touch screens. Many touch screens utilize transparent conductors as sensing elements, and these elements can be provided as a continuous coating or in a pattern such as discontinuous stripes, lines, pads, or the like. Transparent conductors generally have optical properties that can lead to reflections (for example due to an index of refraction difference between the transparent conductor and the underlying substrate), lower transmission (for example due to absorption and reflection of light), and coloration (for example due to preferential absorption over a particular range of wavelengths in the visible spectrum). When the transparent conductor is provided as a single continuous coating, such optical effects may not be apparent if the coating is relatively uniform across the viewable area of the device. In devices that use a transparent conductor pattern, it may be possible to distinguish the areas covered by the pattern from the areas not covered by the pattern due to a difference in optical effects. This can be distracting to the user, and in some applications may be undesirable from an aesthetic point of view. For example, in environments where the device may be exposed to high ambient light conditions, the transparent conductor pattern of the touch sensor device may be undesirably visible even when the underlying display is off.

The present invention provides a touch screen construction that includes a transparent conductor pattern and is configured so that the transparent conductor pattern is less visibly distinguishable. The touch screen construction of the present invention can increase light transmission and decrease reflections in areas covered by the transparent conductor pattern to thereby reduce the visibility of the pattern. In constructions of the present invention, the touch screen substrate includes a coating covering a substrate and having a lower index of refraction than that of the substrate. The transparent conductor pattern is then disposed over this lower index coating. The transparent conductor pattern also has a higher index of refraction than that of the coating. Without wishing to be bound by any theory, the optical thicknesses of the transparent conductor layer and the coating are in a range so that they form, with the substrate, an antireflection stack that functions to reduce reflections of visible light through destructive interference of light waves reflected at the substrate/coating and coating/transparent conductor interfaces. This in turn increases the transmission of light through the touch screen, for example from a display positioned behind the touch screen, and reduces reflection of light from in front of the touch screen. As such, the overall optical effect of the transparent conductor pattern is lessened, thereby making the pattern less distinguishable from areas uncovered by the pattern, and therefore less visible. Additionally, the overall brightness and contrast of the display can be improved due to the increased transmission and reduced external reflections.

Constructions of the present invention also include a material disposed over and substantially covering the transparent conductor pattern so that the material contacts the underlying coating in areas uncovered by the transparent conductor. In this way, the material fills the gaps between portions of the transparent conductor pattern so that the interface in the areas not covered by the pattern is an interface between the underlying coating and the material disposed over the pattern rather than an air interface with the underlying coating. Air interfaces can produce a relatively high index of refraction difference that can lead to undesirably high interfacial reflections, thereby reducing transmission of light through the touch screen and/or reducing contrast of an image viewed through the touch screen, for example due to ambient light reflections. The filler material disposed over the transparent conductor pattern can be selected to reduce reflections at the interface between the substrate coating and the filler material, thus increasing light transmission through the touch screen in areas uncovered by the transparent conductor. The material disposed over the transparent conductor pattern can be any suitable light transmissive material, including an adhesive material. The adhesive material can be used to bond the touch screen construction to another substrate, to a display device, or to another suitable object for mounting or enclosing the touch screen construction.

In a construction of the present invention that includes a substrate, a coating on the substrate, a transparent conductor pattern on the coating, and a filler material disposed over the transparent conductor pattern and filling the gaps between portions of the pattern, exemplary material selections may yield the following refractive indices for each respective component: substrate index of about 1.6 to 1.7 (for example about 1.67 for a polyethylene terephthalate substrate); coating index of about 1.4 to 1.5 (for example about 1.45 for a silicon dioxide coating); transparent conductor index of about 1.8 to 2.1 (for example about 2.0 for indium tin oxide); and filler material index of about 1.4 to 1.8 (for example about 1.7).

The present invention is particularly suited to touch screen constructions that include a plastic substrate such as polyester, for example polyethylene terephthalate (PET). The phenomenon of transparent conductor pattern visibility has been observed by the present inventors to be more pronounced when PET or other flexible plastic films are used as substrates as opposed to when glass is used as a substrate. When glass is used as a substrate, an ITO pattern is typically annealed at temperatures between 300° C. and 400° C. When PET or another temperature-sensitive material is used as a substrate, an ITO pattern cannot be processed as such high temperatures. As a result, ITO patterns on PET may need to be made thicker when compared to those formed and annealed on glass to achieve the desired sheet resistance and uniformity. This can lead to a more visibly noticeable transparent conductor pattern. The present inventors have also observed that the resistance uniformity of an ITO pattern on a PET substrate can be improved by disposing a silicon oxide (e.g. $SiO_2$) coating between the PET substrate and the ITO pattern.

While various aspects of the present invention can be understood with reference to the Figures, the embodiments shown and described by way of example are illustrative but not exhaustive of the full scope contemplated.

FIG. 1 shows a touch screen construction 100 of the present invention the includes a substrate 110, a coating 120 covering the substrate 110, a patterned transparent conductor layer 130 disposed on the coating 120, and a filler material 140 disposed over the transparent conductor pattern 130, the filler material 140 contacting the coating 120 in areas not covered by the transparent conductive material. Touch screen construction 100 can be used in a user activated touch input device where the transparent conductor pattern 130 provides the touch sensing elements.

Surface 112 of the substrate or surface 142 of the filler material can provide the touch surface. Alternatively, one or more additional layers can optionally be disposed between the user and the substrate 110 or filler material 142 for providing a touch surface. For example, a removable and replaceable overlay can be provided so that the touch screen touch surface can be "refreshed" if the touch surface becomes scratched or otherwise damaged. As another example, a hardcoat can be disposed on surface 112 of substrate 110 to provide a touch surface, particularly when substrate 110 is a plastic substrate. As another example, a sheet of glass or other material having desirable durability or other properties can be laminated or otherwise adhered to substrate 110 or filler material 140 with or without other structural or otherwise functional layers disposed between.

Touch screen construction 100 preferably transmits visible light so that a display, graphics, or other information or indicia can be viewed through the touch screen. As such, each of the components identified in FIG. 1 is preferably transmissive of visible light.

Substrate 110 can be any suitable material including glass or plastic. Exemplary plastics include PET, polycarbonates, polyacrylates, substantially transparent polyimides, substantially transparent polyurethanes, and the like. Substrate 110 can be rigid or flexible. Substrate 110 can optionally include additional coatings, for example on surface 112, such as hardcoats, antireflective coatings, polarizers, retarders, wave plates, diffusers, antiglare coatings, light control films, and the like.

Coating 120 can be any suitable material that is desirably transmissive of visible light when coated to a desired thickness and suitably processed. Coating 120 has an index of refraction that is less than the index of refraction of the substrate 110 and less than the index of refraction of the transparent conductive material 130. For example, when PET is used as substrate 110 and ITO is used as the transparent conductor 130, an exemplary material for coating 120 is silicon oxide such as SiO$_2$. Coating 120 substantially covers substrate 110, and can be provided in any suitable manner such as sputter deposition, chemical vapor deposition, and the like. Without wishing to be bound by any theory, coating 120 preferably has a thickness selected to reduce reflections of visible light transmitted through the touch screen 100 in areas covered by the transparent conductor pattern 130.

Transparent conductor pattern 130 can include any suitable transparent conductive material such as transparent conductive oxides or transparent conductive polymers. Examples of transparent conductive oxides include indium tin oxide (ITO), tin antimony oxide (TAO), tin oxide (TO), and the like. Examples of conductive polymers include polypyrrole, polyaniline, polyacetylene, polythiophene, polyphenylene vinylene, polyphenylene sulfide, poly p-phenylene, polyheterocycle vinylene, and materials disclosed in European Patent Publication EP-1-172-831-A2, which is incorporated by reference herein in its entirety. The transparent conductor pattern 130 an be patterned by any suitable means such as deposition of the transparent conductive material through a mask, forming a film of the transparent conductive material and then removing portions of the material by etching or any other suitable removal technique, and the like. Upon patterning the transparent conductive material, portions of the coating 120 are covered by the pattern 130 and other portions of the coating 120 are left uncovered by the pattern 130.

In exemplary constructions, substrate 110 is a film of PET (index of refraction about 1.67), coating 120 is a coating of silicon oxide such as SiO$_2$ (index of refraction about 1.45) having a thickness in a range of about 15 to 70 nm, preferably 25 nm, and transparent conductor 130 is ITO (index of refraction about 2.0) having a thickness of about 20 to 35 nm.

Filler material 140 can be any suitable material that can be coated or otherwise disposed over transparent conductor pattern 130 so that it covers the pattern 130 and substantially fills in the gaps between portions of pattern 130, making contact with coating 120 in areas uncovered by the pattern 130. Filler material 140 can be the same material as used for coating 120. In some embodiments, filler material 140 can be an adhesive material such as an optically clear adhesive, for example an optical grade acrylic pressure sensitive adhesive. Filler material 140 preferably has an index of refraction of about 1.4 to 1.8 in constructions where the substrate 110 is PET, the coating 120 is silicon oxide, and the transparent conductor 130 is ITO. For example, in such constructions suitable filler materials can include an acrylic pressure sensitive adhesive or a silicon oxide.

Construction 100 can be configured for adhering to an object such as the front of a display screen, another substrate (such as glass or another rigid or flexible plate), or another suitable object. This can be done by disposing an adhesive on surface 112 of substrate 110, on surface 142 of filler material 140, on another layer or layers disposed on surface 112 or surface 142, or by using an adhesive as the filler material 140 and bonding directly to the adhesive filler. In such circumstances, a release liner may be provided over the adhesive layer for convenient storage and handling before removing the release liner and suitably adhering the construction to a desired surface.

Figure 2:
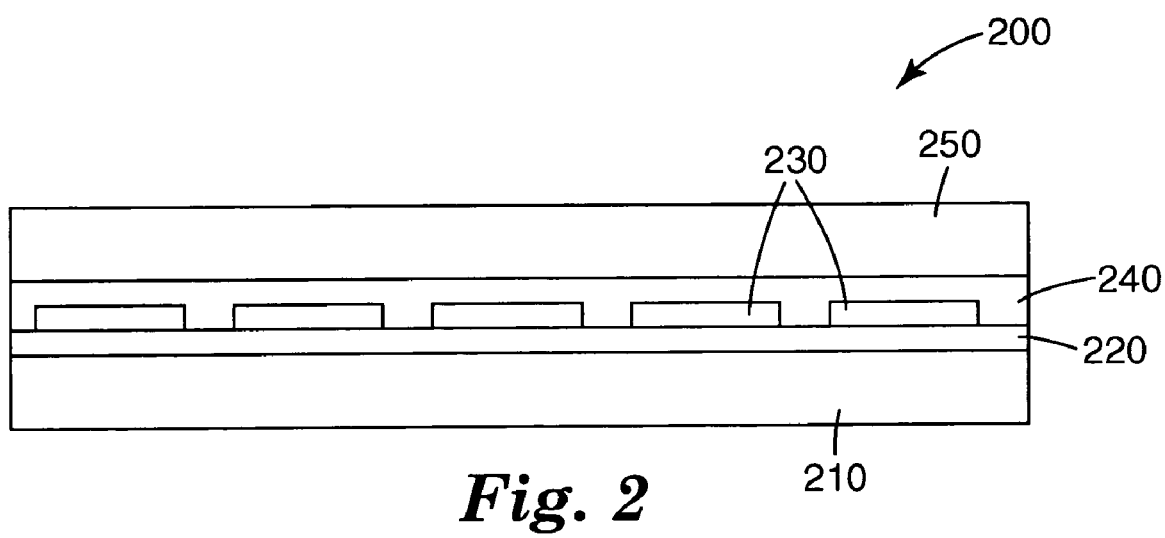
FIG. 2 is a schematic side view of a touch screen construction of the present invention.

FIG. 2 shows a touch screen construction 200 like that shown in FIG. 1 and additionally including a second substrate. Touch screen construction 200 includes a first substrate 210, a coating 220 covering the first substrate 210, a transparent conductor pattern 230 disposed on coating 220, a filler material 240 covering transparent conductor pattern 230 and contacting coating 220 in areas uncovered by the pattern 230, and a second substrate 250 disposed over the filler material 240. Substrate 250 can be bonded to the construction 200 through the use of an adhesive disposed between the filler material 240 and the substrate 250. Alternatively, filler material 240 can itself be an adhesive material that can be used to adhere substrate 250 to the construction 200. In embodiments where filler layer 240 is an adhesive, any suitable adhesive can be used that is capable of being disposed over transparent conductor pattern 230 and coating 220 so that the adhesive contacts the transparent conductor pattern 230 and the uncovered portions of the coating 220. Exemplary adhesives include pressure sensitive adhesives and/or acrylic adhesives, and are preferably optically clear. Substrate 250 can be any suitable material include glass and plastic, and can be rigid or flexible.

The transparent conductor patterns 130 of construction 100 and 230 of construction 200 can form the sensing elements for touch screens. When a conductive touch object such as a user's finger comes into close enough proximity, the conductive touch object can be capacitively coupled to one or more of the sensing elements that make up the transparent conductor pattern. In many cases, the transparent conductor pattern includes a series of independently addressable transparent conductive lines, stripes, pads, traces, or the like. Controller electronics drive each of these so that capacitive coupling with a touch object results in a detectable signal. From the strength of the signals, it can be determined which portion or portions of the transparent conductor pattern are being capacitively coupled, thereby identifying the position of the touch.

Figure 3:
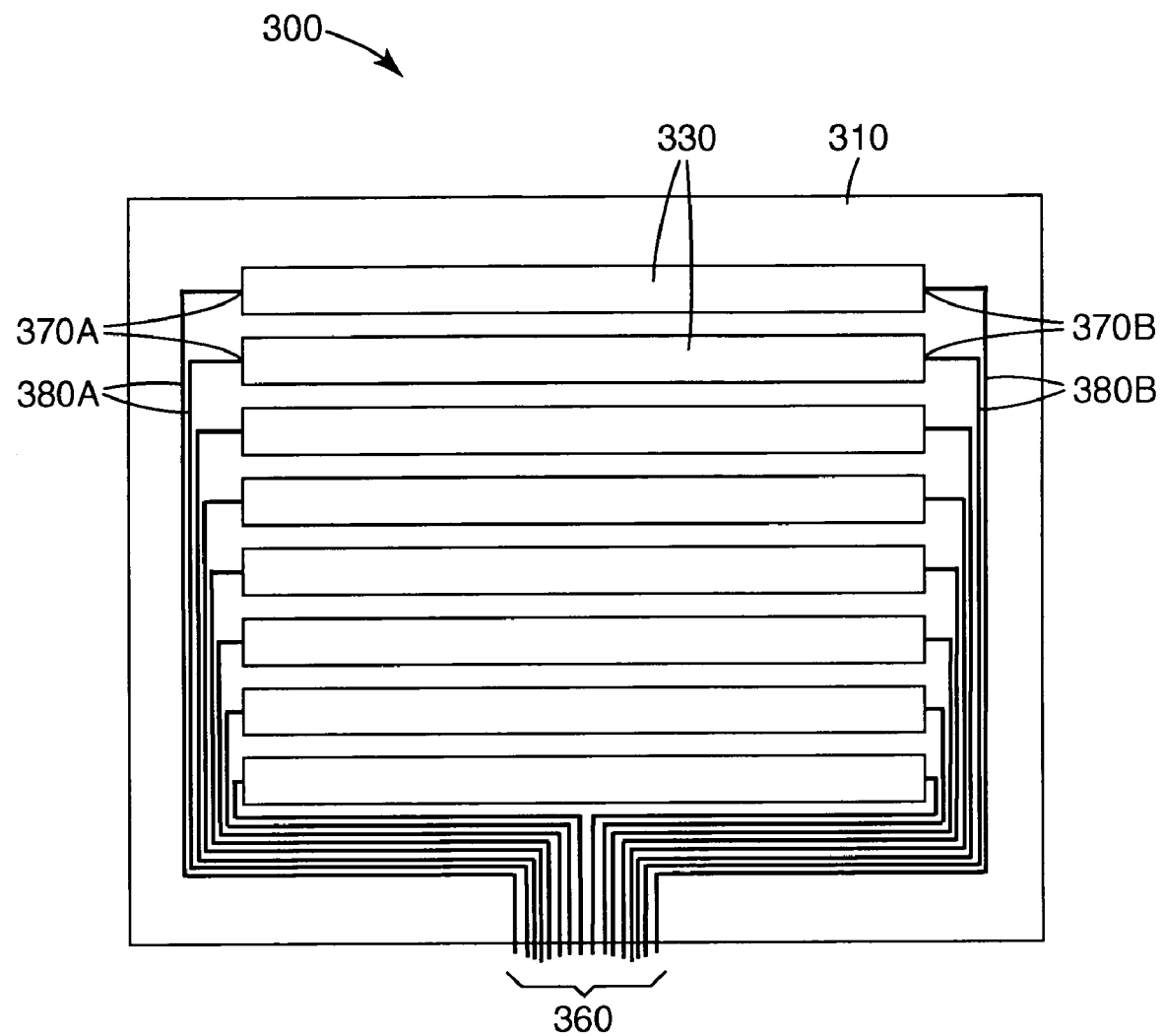
FIG. 3 is a schematic plan view of a touch screen construction utilizing a pattern of transparent conductors as sensing elements.

FIG. 3 shows one example of a touch screen 300 that includes a plurality of parallel transparent conductive bars 330 disposed on a substrate 310. Each bar 330 can be connected on a first end 370A and a second end 370B to lead lines 380A and 380B, respectively. The lead lines are configured so that each bar can be individually identified. The lead lines can be gathered together in a grouping 360 along an edge of the touch screen 300 that can be connected to an electronic tail (not shown) for electrically coupling the touch screen to controller electronics (not shown). Examples of such touch screens are disclosed in U.S. Pat. No. 5,650,597, U.S. patent Publication 2003/0103043, and U.S. patent application Ser. Nos. 10/176,564, 10/324,728, and 10/201,400, each of which is incorporated by reference into this document. Touch location can be determined in the y-direction by which bar exhibits the highest signal (and by interpolation methods if further positional refinement is desired), and in the x-direction by comparing the amount of current passing through each end of the bar. This type of touch screen is commercially available from 3M Touch Systems, Inc., under the trade designation Near Field Imaging.

Figure 4:
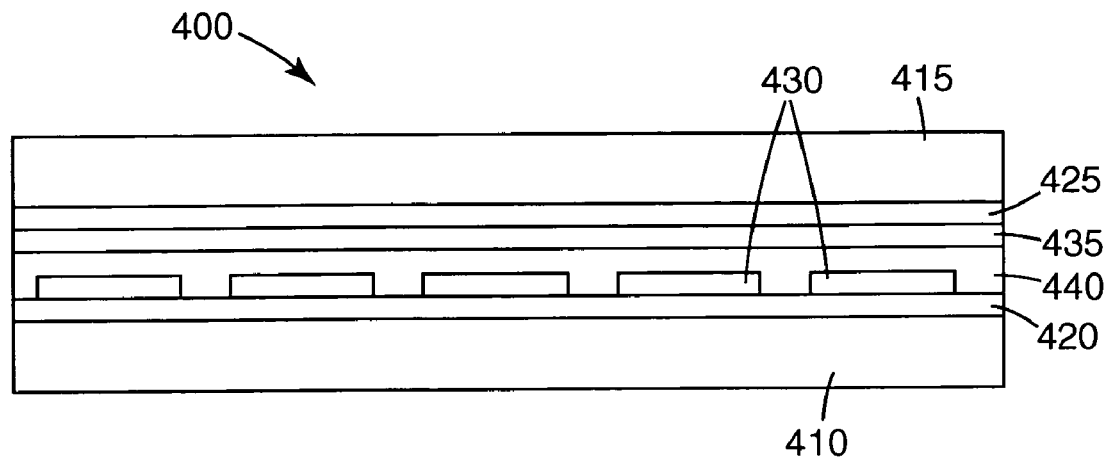
FIG. 4 is a schematic side view of a touch screen construction of the present invention.

FIG. 4 shows another touch screen construction 400 of the present invention that includes a first substrate 410, a first coating 420 substantially covering the substrate 410, and a first series of parallel transparent conductive traces 430 disposed on the first coating 420. Touch screen 400 also includes a second substrate 415 substantially covered by a second coating 425 and a second series of transparent conductive traces 435 disposed on the second coating 425 and oriented perpendicular to the first series of transparent conductive traces 430. A filler material 440 is disposed between the first series of transparent conductive traces 430 and second series of transparent conductive traces 435 and contacting the first coating 420 and second coating 425 in areas uncovered by the transparent conductive traces. Filler material 440 is preferably an adhesive to bond the first substrate 410, first coating 420, and first pattern 430 to the second substrate 415, second coating 425, and second pattern 435. The first coating 420 has a refractive index that is less that that of the first substrate 410 and the first series of transparent conductive traces 430. Similarly, the second coating 425 has a refractive index that is less that of the first substrate 415 and the first series of transparent conductive traces 435.

During operation, a conductive touch object can be capacitively coupled either through the first substrate 410 or the second substrate 415 with at least one of the first series of transparent conductive traces 430 and at least one of the second series of transparent conductive traces to determine both the x-and y-coordinates of the touch input. This type of touch screen can be referred to as a matrix-type touch screen. Examples of matrix-type touch screens are disclosed in U.S. Pat. Nos. 6,188,391; 5,844,506; and 5,386,219, as well as International Publications WO 01/27868, WO 02/100074, and WO 01/52416.

Figure 5:
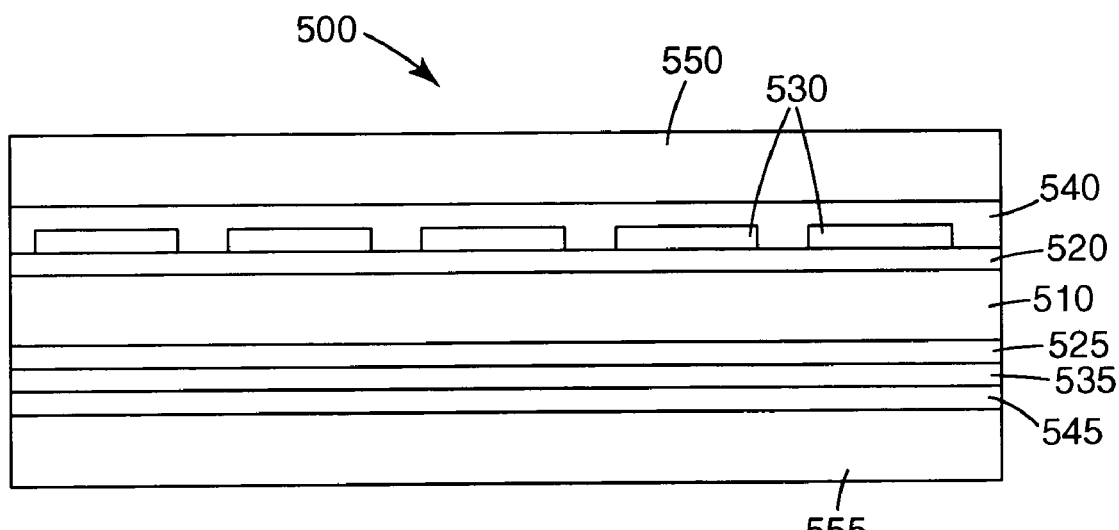
FIG. 5 is a schematic side view of a touch screen construction of the present invention.

FIG. 5 shows another example of a matrix-type touch screen according to the present invention. Touch screen construction 500 includes a substrate 510 having a first coating 520 substantially covering one surface and a second coating 525 substantially covering the opposing surface. A first series of transparent conductive traces 530 is disposed on the first coating 520 and a second series of transparent conductive traces 535 is disposed on the second coating 525 in an orientation orthogonal to the first series of transparent conductive traces. In this way, the same substrate 510 has coatings and transparent conductor patterns on both opposing surfaces. A filler material 540, preferably an adhesive, is disposed over transparent conductive traces 530 in such a manner that the filler material covers the transparent conductive traces 530 and contacts the coating 520 in areas not covered by the transparent conductive traces 530. An optional top substrate 550 can be disposed over the filler layer 540, and can be bonded to the construction 500 using a separate adhesive layer or through the filler layer 540 if the filler material is itself an adhesive. An optional adhesive or other filler layer 545 can be disposed over transparent conductive traces 535, and an optional bottom substrate 555 can be disposed over the optional filler layer 545, if provided.

Figure 6:
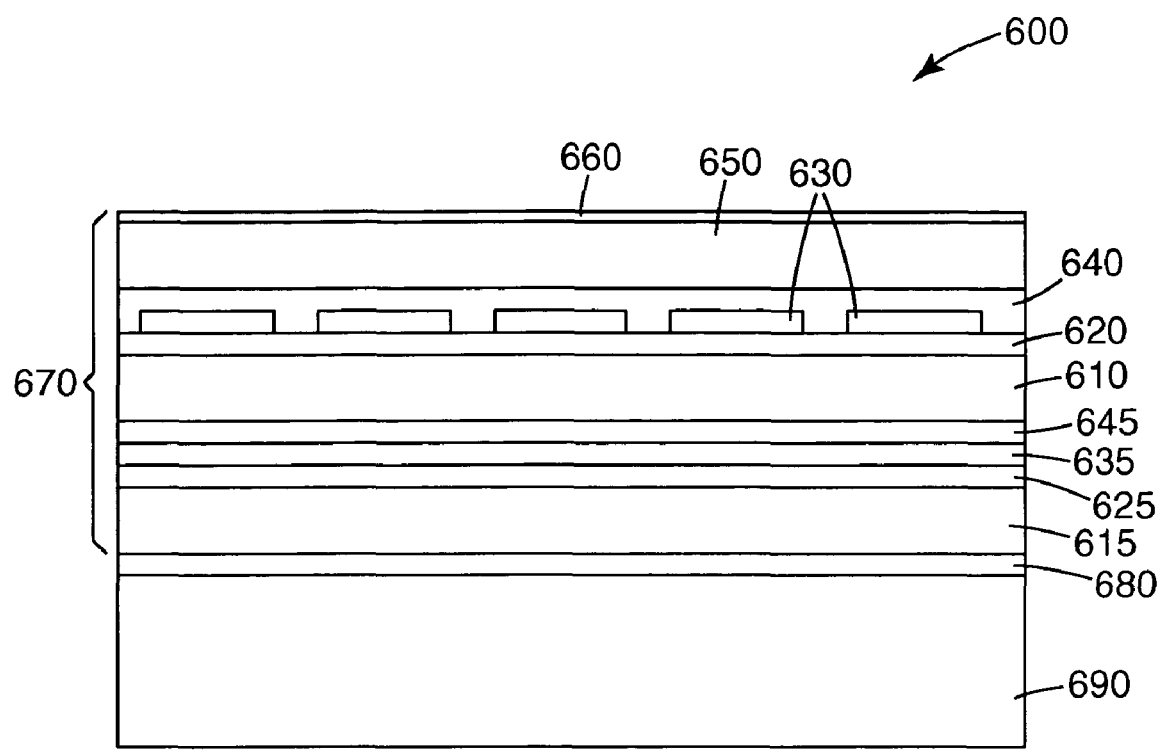
FIG. 6 is a schematic side view of a touch screen construction of the present invention.

FIG. 6 shows another touch screen according to the present invention. Touch screen 600 includes a touch screen construction 670 bonded to a support substrate 690 via an adhesive layer 680. Touch screen construction 670 includes a first substrate 615 coated with a first coating 625, a first transparent conductor pattern 635 disposed on first coating 625, and a first filler material 645 disposed over first transparent conductor pattern 635 and filling the gaps between portions of pattern 635 to contact coating 625. Touch screen construction 670 also includes a second substrate 610 coated with a second coating 620, a second transparent conductor pattern 630 disposed on second coating 620, and a second filler material 640 disposed over second transparent conductor pattern 630 and filling the gaps between portions of pattern 630 to contact coating 620. Construction 670 also includes a top substrate 650 having a hardcoat layer 660 configured to provide a touch surface for the construction. Preferably, filler materials 640 and 645 are adhesive materials to bond together adjacent elements of the construction. Alternatively, separate adhesive layers (not shown) can be used.

Support substrate 690 can be any suitable substrate including rigid or flexible materials, for example glass or plastic. In exemplary embodiments, support substrate 690 is a rigid glass substrate, and substrates 610, 615, and 650 are flexible plastic substrates. In this way, subconstructions of construction 670 can be made on each of the flexible substrates 610, 615, and 650 using roll-to-roll or other suitable processing methods. Each of the subconstructions can then be laminated or otherwise adhered together to form construction 670, which can in turn be bonded to a support substrate 690.

Figure 7:
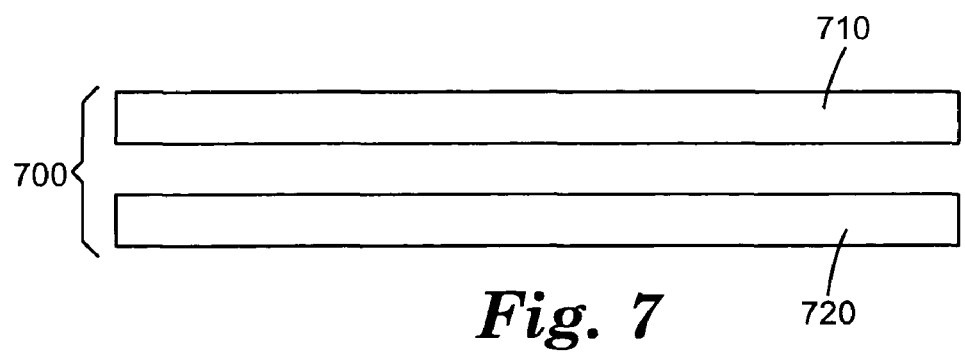
FIG. 7 is a schematic side view of a touch screen system.

FIG. 7 schematically shows a touch screen system 700 that includes a touch screen 710 according to the present invention disposed proximate a display element 720 so that display element 720 can be viewed through touch screen 710. The touch screen 710 can be used as an input device to interact with information shown on the display element 720. Display element 720 can be an electronic display capable of changeably displaying information such as text or graphics. Display element 720 could also include static information such as printed graphics, text, or other indicia. Display element 720 can combine an electronic display with static graphics, for example in the form of icons on a display screen that may be printed or otherwise disposed directly on the display screen or provided on a separate sheet that can be positioned for viewing through the touch screen 710. Graphics, characters, or other indicia can also be provided in front of touch screen 710.

A Near Field Imaging touch sensor construction was made by the following procedure.

$SiO_2$ was sputter coated on a 7 mil (about 0.2 mm) sheet of PET to form a 250 Angstrom coating of the $SiO_2$ substantially covering the PET substrate. The PET substrate used was a standard PET film primed on one surface with a print treatment. The $SiO_2$ was coated on the non-print treated side. The $SiO_2$ coating had an index of refraction of about 1.46.

A removable, water soluble, patterning ink was screen printed on top of the $SiO_2$ in areas where the transparent conductor pattern was not specified, for example between areas specified for the pattern and in a border area.

ITO was sputter coated over both the $SiO_2$ and screen-printed water soluble ink at a thickness sufficient to achieve a 450 Ohm/square resistivity. ITO can be suitably sputter coated using metal or ceramic targets and over a wide range of temperature and processing conditions.

The patterning ink was removed with water, and the sample was dried, leaving a pattern of ITO bars as the transparent conductor pattern of sensing electrodes.

A silver conductive ink was screen printed on the ITO and $SiO_2$ and dried to thicknesses of about 0.3 to 0.6 mils (about 8 to 15 microns) to form conductive traces connecting to each of the ITO bars.

A solvent-based epoxy insulator ink was screen printed over the silver conductive ink and thermally cured, leaving vias in the epoxy for electrical connections to be made to an electrical tail. This printing step was repeated to produce two layers.

Silver conductive ink traces were screen printed over the printed insulator and dried to thicknesses of 0.3 to 0.6 mils (about 8 to 15 microns) to make connections through the vias.

A carbon conductive ink was screen printed and dried to a 0.3 to 0.6 mil thickness (about 8 to 15 microns) over the silver ink on the end of the tail to protect the traces from corrosion and abrasion.

A 1.42 mil (about 0.036 mm) PET film was coated with a 0.5 mil (about 13 microns) thick layer of an optical acrylic pressure sensitive adhesive and roll-to-roll laminated to the sample with the adhesive side down, leaving the electrical tail exposed.

The printed-treated side of the first PET film was sputter coated with ITO at a thickness sufficient to achieve a resistivity of about 150 Ohm/square. This ITO forms a shield layer for the touch sensor device.

Silver conductive ink was screen printed around the perimeter of the ITO shield layer and the electrical tail, and dried to a thickness of about 0.3 to 0.6 mils (about 8 to 15 microns mm) for electrical connection to the shield layer.

A solvent-based epoxy insulator ink was screen printed over the silver conductive ink on the shield layer and thermally cured.

Silver conductive ink was screen printed around the perimeter of the second, laminated PET film to form a top guard layer. The silver ink was dried to form a thickness of 0.3 to 0.6 mils (about 8 to 15 microns mm).

A solvent-based epoxy insulator ink was screen printed over the top guard layer and thermally cured.

A 7 mil (about 0.18 mm) thick acrylic hard coated PET film was laminated to a layered construction including an acrylic optical grade pressure sensitive adhesive (0.8 mil (0.02 mm) adhesive/0.92 mil (0.023 mm) PET/0.8 mil (0.02 mm) adhesive) and then laminated over the top guard layer of the construction.

An acrylic optical adhesive/PET/acrylic optical adhesive construction (0.8 mil (0.02 mm) adhesive/0.92 mil (0.023 mm) PET/0.8 mil (0.02 mm) adhesive) with a release liner was laminated to the back shield.

The top surface of the construction was masked with a polyethylene/adhesive mask material, and the construction was cut into sheets, which were then die cut into parts.

The die cut parts were laminated to glass backing panels.

The resulting parts had ITO bars that were very difficult to see either by reflected light or transmitted light, and the ITO bars were configured for connecting to controller electronics for sensing the position of conductive touch implements capacitively coupled to the ITO bars.

Optical modeling was used to compare the internal transmission of visible light for constructions of the present invention and otherwise identical constructions that did not include a lower index coating between a substrate and a transparent conductor. Each construction and its corresponding comparative construction was also compared to a similar control construction that did not include a transparent conductor layer. The difference between the transmission of each construction and the corresponding control construction indicates the relative level of distinguishability of areas covered by a transparent conductor pattern versus areas not covered by a transparent conductor pattern in the constructions in question. The following constructions were evaluated, the layers designated in order for each construction:

Construction 1:
1.67 refractive index layer (to simulate a PET substrate)
30 nm thick 1.46 refractive index layer (to simulate silicon oxide)
20 nm thick 2.0 refractive index layer (to simulate ITO)
30 nm thick 1.46 refractive index layer (to simulate silicon oxide)
1.5 refractive index layer (to simulate an optical adhesive)
Comparative Construction C1 (Same as Construction 1 without Coating Between Substrate and ITO):
1.67 refractive index layer (to simulate a PET substrate)
20 nm thick 2.0 refractive index layer (to simulate ITO)
30 nm thick 1.46 refractive index layer (to simulate silicon oxide)
1.5 refractive index layer (to simulate an optical adhesive)
Control Construction X1:
1.67 refractive index layer (to simulate a PET substrate)
30 nm thick 1.46 refractive index layer (to simulate silicon oxide)
1.5 refractive index layer (to simulate an optical adhesive)
Construction 2:
1.67 refractive index layer (to simulate a PET substrate)
30 nm thick 1.46 refractive index layer (to simulate silicon oxide)
20 nm thick 2.0 refractive index layer (to simulate ITO)
1.5 refractive index layer (to simulate an optical adhesive)
Comparative Construction C2 (Same as Construction 2 without Coating Between Substrate and ITO):
1.67 refractive index layer (to simulate a PET substrate)
20 nm thick 2.0 refractive index layer (to simulate ITO)
1.5 refractive index layer (to simulate an optical adhesive)
Control Construction X2:
1.67 refractive index layer (to simulate a PET substrate)
1.5 refractive index layer (to simulate an optical adhesive)

Internal transmission of visible light (wavelengths from 400 nm to 700 nm) for each of these constructions was modeled using SCI Film Wizard optical modeling software. Results for three wavelengths across the visible spectrum are given in Table 1. $\Delta$ represents the difference between the transmission of the identified construction and the corresponding control construction.

TABLE 1

Internal Transmission for Various Constructions

| Construction | % T @ 400 nm | $\Delta$ | % T @ 550 nm | $\Delta$ | % T @ 700 nm | $\Delta$ |
|---|---|---|---|---|---|---|
| 1 | 89 | 0.9 | 89.8 | 0.1 | 90 | 0.1 |
| C1 | 88.5 | 1.4 | 89.2 | 0.7 | 89.4 | 0.5 |
| X1 | 89.9 | | 89.9 | | 89.9 | |
| 2 | 88.9 | 1.0 | 89.7 | 0.2 | 90 | 0.1 |
| C2 | 88.5 | 1.4 | 89.2 | 0.7 | 89.4 | 0.5 |
| X2 | 89.9 | | 89.9 | | 89.9 | |

The modeling results indicate that constructions of the present invention exhibit increased transmission in areas covered by the transparent conductor pattern throughout the visible spectrum. The modeling results also indicate that the transmission difference between areas covered by the transparent conductor and areas not covered by the transparent conductor are less for constructions of the invention than for otherwise identical comparative constructions that do not include a lower index coating between the substrate and the transparent conductor pattern. Such reduced difference in transmission between covered and uncovered areas results in a transparent conductor pattern that is less visually distinguishable.

It is also instructive to compare the $\Delta$ for both Constructions 1 and 2 to the $\Delta$ for Comparative Construction C2, which best represents typical known constructions for such touch screens on flexible substrates. Since both Control Constructions X1 and X2 were identical in optical performance, these $\Delta$'s can be directly compared. Such comparison indicates that both Construction 1 and Construction 2 exhibit improved transmission in the ITO covered regions over the entire visible spectrum when compared to Comparative Construction C2, and that Construction 1, which includes a silicon oxide layer over and under the ITO, exhibits slightly improved transmission for portions of the visible spectrum over Construction 2, which includes a silicon oxide layer only under the ITO.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A touch screen comprising:
   a substrate;
   a coating substantially covering the substrate;
   a transparent conductor pattern disposed on the coating, the pattern leaving areas of the coating uncovered; and
   a filler material covering and contacting both the transparent conductor pattern and the areas of the coating uncovered by the transparent conductor pattern;
   wherein the coating has a refractive index that is less than that of the substrate and less than that of the transparent conductor pattern.

2. The touch screen of claim 1, wherein the filler material has a refractive index matching or nearly matching the refractive index of the coating.

3. The touch screen of claim 1, wherein the filler material is the same as the material of the coating.

4. The touch screen of claim 1, wherein the filler material comprises silicon oxide.

5. The touch screen of claim 1, wherein the filler material is an adhesive.

6. The touch screen of claim 1, wherein the substrate comprises plastic.

7. The touch screen of claim 1, wherein the substrate comprises polyester.

8. The touch screen of claim 1, wherein the substrate includes a hardcoat disposed on a surface opposing the coating.

9. The touch screen of claim 1, wherein the coating comprises silicon oxide.

10. The touch screen of claim 1, wherein the transparent conductor pattern comprises a transparent conductive oxide.

11. The touch screen of claim 1, wherein the transparent conductor pattern comprises indium tin oxide.

12. The touch screen of claim 1, wherein the transparent conductor pattern comprises a conductive polymer.

13. The touch screen of claim 1, wherein the substrate has a refractive index of about 1.6 to 1.7, the transparent conductor pattern has a refractive index of about 1.8 to 2.1, the coating has a refractive index of about 1.4 to 1.5, and the filler material has a refractive index of about 1.4 to 1.8.

14. The touch screen of claim 1, further comprising a second substrate disposed over the filler material.

15. The touch screen of claim 14, wherein the second substrate comprises glass.

16. The touch screen of claim 14, wherein the second substrate comprises plastic.

17. The touch screen of claim 14, wherein the second substrate comprises polyester.

18. The touch screen of claim 14, wherein the second substrate is bonded to the touch screen by an adhesive.

19. The touch screen of claim 18, wherein the adhesive is the filler material.

20. The touch screen of claim 1 wherein the coating has a thickness selected to substantially reduce reflections of visible light in areas covered by the transparent conductor pattern.

21. The touch screen of claim 1, wherein the transparent conductor pattern comprises a plurality of parallel stripes.

22. The touch screen of claim 1, wherein the transparent conductor pattern is configured for connecting to controller electronics adapted to determine touch location from signals generated when a conductive touch implement is capacitively coupled to a portion of the pattern.

23. The touch screen of claim 22 being arranged so the touch implement is capacitively coupled to the transparent conductor pattern through the substrate.

24. The touch screen of claim 22 being arranged so the touch implement is capacitively coupled to the transparent conductor pattern through the filler material.

25. The touch screen of claim 22 being arranged so the touch implement is capacitively coupled to the transparent conductor pattern through a second substrate disposed over the filler material.

26. The touch screen of claim 1 configured to be disposed over an electronic display so that the display can be viewed through the touch screen.

27. The touch screen of claim 1, further comprising a second substrate, a second coating substantially covering the second substrate, a second transparent conductor pattern disposed on the second coating to leave areas of the second coating uncovered by the pattern, and a second filler material covering and contacting both the second transparent conductor pattern and the areas of the second coating uncovered by the transparent conductor pattern.

28. A touch screen construction comprising:
    a PET substrate;
    an silicon oxide layer covering the PET substrate;
    an array of parallel ITO bars disposed on the silicon oxide layer; and
    an optically clear pressure sensitive adhesive disposed over and covering the ITO bars, the optically clear pressure sensitive adhesive having a refractive index in the range of 1.4 to 1.8 inclusive.

29. The touch screen construction of claim 28 adhered to a second substrate through the optically clear adhesive.

30. The touch screen construction of claim 29, wherein the second substrate comprises plastic.

31. The touch screen construction of claim 29, wherein the second substrate comprises glass.

32. A touch screen comprising:
    a touch screen construction comprising:
    a transparent conductor patterned on a substrate;
    a first layer substantially covering the substrate and disposed between the transparent conductor and the substrate, the first layer configured to increase visible light transmission through the touch screen in areas covered by the transparent conductor; and
    a second layer disposed to contact the transparent conductor in areas covered by the transparent conductor and to contact the first layer in areas uncovered by the transparent conductor, the second layer configured to substantially inhibit visible light reflections at contact interfaces between the first layer and the second layer.

33. The touch screen of claim 32, wherein the touch screen construction further comprises a second substrate disposed over the second layer.

34. The touch screen of claim 32, further comprising an electronic display positioned for viewing through the touch screen construction.

35. A method for reducing the visibility of a patterned transparent conductor in a touch screen comprising:
   coating an undercoat material between a substrate and the patterned transparent conductor so that the undercoat material substantially covers the substrate, the undercoat material having a refractive index that is less than that of the substrate and the patterned transparent conductor, and wherein the patterned transparent conductor leaves areas of the undercoat material exposed; and
   disposing a filler material over the patterned transparent conductor and exposed areas of the undercoat material, the filler material having a refractive index and thickness selected to reduce interfacial reflections of visible light in areas covered by the patterned transparent conductor.

36. The method of claim 35, further comprising the step of disposing a second substrate over the filler material.

37. The method of claim 35, further comprising the step of forming the patterned transparent conductor.

38. The touch screen of claim 32, wherein the first layer has a refractive index that is less than that of the substrate and less than that of the transparent conductor.

* * * * *

UNITED STATES PATENT AND TRADEMARK OFFICE
CERTIFICATE OF CORRECTION

PATENT NO.      : 8,068,186 B2
APPLICATION NO. : 10/686141
DATED           : November 29, 2011
INVENTOR(S)     : Brian E Aufderheide It is certified that error appears in the above-identified patent and that said Letters Patent is hereby corrected as shown below:

Column 2
Line 33; delete "the. particular" and insert -- the particular -- therefor.

Column 5
Line 20; delete "an be" and insert -- can be -- therefor.

Column 7
Line 2; delete "that that" and insert -- than that -- therefor.
Line 5; delete "that of" and insert -- than that of -- therefor.

Signed and Sealed this
Twenty-seventh Day of March, 2012

David J. Kappos
*Director of the United States Patent and Trademark Office*